United States Patent [19]

Vignaud

[11] 4,440,835

[45] Apr. 3, 1984

[54] THIN NON-FLAT GAS ELECTRODE, CURRENT COLLECTOR AND PROCESS OF MANUFACTURE

[75] Inventor: René Vignaud, Aulnay Sous Bois, France

[73] Assignee: Societe Les Piles Wonder, Saint Ouen, France

[21] Appl. No.: 367,993

[22] Filed: Apr. 13, 1982

[30] Foreign Application Priority Data

Apr. 13, 1981 [FR] France .................. 81 07407
Apr. 13, 1981 [FR] France .................. 81 07408

[51] Int. Cl.³ ...................... H01M 4/88; H01M 4/86
[52] U.S. Cl. ...................... 429/42; 427/115; 502/101
[58] Field of Search ............. 429/42; 252/425.3; 427/115

[56] References Cited

U.S. PATENT DOCUMENTS

| | | | |
|---|---|---|---|
| 3,125,468 | 3/1964 | Thompson et al. | 429/42 |
| 3,276,909 | 10/1966 | Moos | 136/86 |
| 3,347,708 | 10/1967 | Drengler | 136/86 |
| 3,419,900 | 12/1968 | Elmore et al. | 429/42 |
| 3,423,246 | 1/1969 | Prager et al. | 429/42 |
| 3,935,029 | 1/1976 | Baker et al. | 429/42 |
| 4,043,933 | 8/1977 | Breault et al. | 429/42 |
| 4,177,159 | 12/1979 | Singer | 429/42 |
| 4,248,682 | 2/1981 | Lindstrom et al. | 429/27 |
| 4,263,276 | 4/1981 | Blurton | 429/42 |
| 4,339,325 | 7/1982 | Solomon et al. | 429/42 |

FOREIGN PATENT DOCUMENTS

| | | |
|---|---|---|
| 1258760 | 3/1961 | France . |
| 1321359 | 2/1963 | France . |
| 1440054 | 4/1965 | France . |
| 1455261 | 10/1966 | France . |
| 1457130 | 10/1966 | France . |
| 1476637 | 4/1967 | France . |
| 1140635 | 1/1969 | United Kingdom . |
| 1213647 | 11/1970 | United Kingdom . |

*Primary Examiner*—Donald L. Walton
*Attorney, Agent, or Firm*—Fleit, Jacobson, Cohn & Price

[57] ABSTRACT

The invention relates to a process for manufacturing an electrode, particularly a thin gas electrode of any non flat shape, characterized in that an homogeneous mixture is prepared of dry particles of active compounds, formed by at least one compound with electrocatalytic activity and possibly by at least one compound presenting electronic conductivity, and dry polytetrafluoroethylene fibers, a lubricant is added and possibly a surfactant so as to cause coating of the particles of the mixture with the lubricant, and the lubricated particles of the mixture are shaped to form the electrode. Thus, electrodes of different shapes are obtained, for example a glove finger shape.

The invention also relates to a process for preparing a current collector for an electrochemical device electrode, characterized in that there is deposited, on at least a part of the surface of this electrode, a thin porous metal film adhering to the electrode. The deposit is formed by metal plating and it may be advantageously formed from nickel or copper, having a thickness between 0.01 mm and 5 mm; preferably of the order of 0.05 mm.

19 Claims, 15 Drawing Figures

THIN NON-FLAT GAS ELECTRODE, CURRENT COLLECTOR AND PROCESS OF MANUFACTURE

The invention relates to thin electrodes for electrochemical devices or generators (batteries and accumulators, i.e. primary and secondary cells). It relates more particularly to thin gas electrodes.

It has as object a process for preparing such electrodes for obtaining thin electrodes of any desired shape, and the thin electrodes of any shape obtained by this process.

At the present time, manufacture of thin flat shaped electrodes for electrochemical devices from a paste containing polytetrafluoroethylene is known.

For example, U.S. Pat. No. 3,419,900 to Elmore and Tanner describes a thin flat gas electrode for a fuel cell obtained by preparing a pasty mixture which contains a metal electrocatalytic powder and a water-repellent substance, formed preferably by a colloidal dispersion of polytetrafluorethylene, and applying this pasty mixture to a grid, made for example from silver or platinum; then the grid coated with the pasty mixture is dried, then heated to eliminate the dispersion agent of the soap type.

In addition, French patent No. 1 522 224 of the American Cyanamid Company is known, which advocates forming a gas electrode for a fuel cell from a pasty mixture containing a metal catalyst in the form of an aqueous solution, a water repellent substance formed for example by a polyfluorethylene latex and, if required, a lubricant such as a mineral oil and a dispersant agent, such as silica or granular or colloidal alumina; according to U.S. Pat. No. 1,522,224, said mixture is applied to a metal grid, then the grid, thus coated and covered on each side with a plastic material foil, is calendered or laminated between rotary rollers, the calendering and laminating operation being repeated several times; then the thin flat electrode thus obtained is washed with a solvent to remove therefrom the lubricant and the dispersant agent when the mixture comprises same.

Finally French patent No. 2 143 593 belonging to the Compagnie Générale d'Electricité describes a process for manufacturing flat multi-layer electrodes, in which a mixture of a conducting material and a gum or latex of a water-repellent product, such a polytetrafluorethylene, is prepared; the mixture disposed more particularly on a medium such as a grid or an expanded metal, or a porous sheet made for example from polytetrafluorethylene, is dried and laminated; thus a layer is obtained, several layers are stacked together and the stack thus formed is compressed to obtain a flat multi-layer electrode.

With these known processes, a thin flat electrode is obtained comprising an electrocatalytic agent and a water-repellent agent (particularly polytetrafluorethylene).

The invention, as far as it is concerned, allows electrodes of any desired shape to be formed.

The process of the invention consists:

on the one hand, in mixing—with a material having electrocatalytic properties, accompanied possibly by a material providing electronic conduction—a water-repellent substance formed in accordance with the first characteristic of the invention by polytetrafluorethylene, called hereafter PTFE, obtained by coagulation of PTFE in emulsion form and being in the form of particles formed from small fibers, which particles have an average size of the order of 0.5 mm so as to form a dry mixture to which a lubricant is added so as to form a pasty mixture;

on the other hand, not in laminating or calendering this pasty mixture, but in giving it, according to a second characteristic of the invention, any desired shape by a forming process, known per se, such as compression in a mold, injection, transfer.

It can be seen that, in accordance with the present invention, as water-repellent substance there is used a PTFE in the form of fiber particles, of average size of the order of 0.5 mm, obtained by coagulation of a PTFE emulsion and the pasty mixture containing the active products, the lubricant and the particular PTFE is given any desired shape, more especially by compression in a mold, injection or transfer.

Thus an electrode is obtained having any desired shape, for example the shape of a hollow cylinder, a hollow truncated cone, a glove finger, a hollow prism, this enumeration being in no wise limiting. The Applicant has discovered that if another type of PTFE is used, particularly a colloidal dispersion of PTFE, as advocated by the above-mentioned U.S. Pat. NO. 3,419,900 or a latex or gum of PTFE, as specified in the above-mentioned French patent Nos. 1 522 224 or 2 143 593, it was not possible, even in the presence of a lubricant, to obtain a thin non flat electrode, industrially usable, by compression in a mold, injection or transfer, for the electrode thus obtained split during manufacture or as soon as it was used.

Now, it is very interesting to construct for electrochemical generators, thin non flat electrodes, particularly thin gas electrodes, having a complex shape, particularly:

for the purpose of adapting the electrode and the generator which comprises it to a particular use;

for allowing the electrode to be housed in a case of a special shape;

to achieve a desired concentration gradient of the electroactive gaseous compound preparations;

for simplifying the construction of the generator in the case where it is desired that the electrode form an integral part of the receptacle of the generator.

Now the Applicant has discovered, as mentioned above, that it was not possible to form thin non flat electrodes usable in electrochemical generators, if pasty mixtures were shaped containing, in addition to the active materials, PTFE in the form of an aqueous suspension, which is commercially available and which comprises about 60% of dry PTFE to which a wetting agent has been added. After drying and evaporation of the mixture of active materials and of this suspension, a paste is obtained which it is not possible to put into a non flat shape, even with the addition of a lubricant, for the electrode obtained other than by calendering or laminating, as advocated in the above-mentioned prior patents which concern the manufacture of flat electrodes, is fragile and lacks the mechanical strength required for industrial use.

The invention has first of all as object a process for manufacturing electrodes, particularly thin gas electrodes of any non flat shape characterized in that a homogeneous mixture is prepared from dry particles of active compounds, formed by at least one compound having electrocatalytic activity and possibly by at least one compound having electronic conductivity and dry fibers of polytetrafluorethylene, a lubricant is added and possibly a surfactant so as to coat the particles of the mixture with the lubricant and the lubricated particles of the mixture are shaped.

The catalytic active compound may be formed by carbon catalyzed by means of silver, manganese dioxide, a phtalocyanine.

The electronic conducting compound, which is generally also present, may be formed by carbon black, graphite.

The polytetrafluorethylene to be used is formed by particles formed from dry fibers and having an average size of the order of 0.5 mm, obtained by coagulation of a PTFE emulsion, for example of the type commercially available under one of the following designations:

Du Pont de Nemours, series 6
Imperial Chemical Industries (ICI), series CD
Hoechst, series 2000
Produits Chimiques Ugine Kuhlmann (PCUK), series 6
Montedison, series DPTA.

The lubricant may be formed by at least one liquid hydrocarbon (white spirit, kerosene, naphta solvent) or at least one oil (Rissela oil).

If the surface tension of the lubricant is too high to allow good wettability of the particles of the mixture of active compounds and PTFE, it is advantageous to add thereto a surfactant, such as alcohols or ketones, to lower the surface tension.

The dry mixture may be advantageously formed in a mixer driven at a high rotational speed.

In so far as the shaping operation is concerned, it should first of all be noted that this may be performed by compression of the homogeneous mixture before or after addition of the lubricant and possibly of the surfactant.

It has further been discovered that the shaping operations and conveying of the lubricated mixture to the shaping operation must be carried out preferably without changing the direction of the lubricated mixture flow, so as to maintain the orientation of the PTFE fibers so that these fibers remain parallel to each other, for thus the strength of the electrode obtained is increased.

Finally, the shaping operation may be achieved by compression, by injection, by transfer.

The invention also relates to electrodes, more particularly thin gas electrodes, of any desired shape obtained by using the abovementioned process.

The invention applies particularly, but not exclusively, to the manufacture of positive or cathode electrodes for electrochemical generators (primary or secondary cells).

The present invention also relates to the preparation of current collectors for electrochemical devices or generators (batteries and accumulators, i.e. primary or secondary cells) and more precisely unitary electrode-current collector assemblies.

The process for preparing current collectors for electrochemical devices consists in depositing the collector on the electrode in the form of a thin conducting film, inseparable (short of causing damage thereto) from this electrode. The film is more especially a porous metal film adhering to the surface of the electrode. It takes on the exact shape of the electrode, which may be any shape whatever.

This process is more particularly suitable to depositing a collector on an electrode having any non flat shape.

The invention also has as object a process for preparing a current collector for an electrochemical device electrode, characterized in that there is deposited, on at least a part of the surface of this electrode, a thin porous metal film adhering to the electrode.

This deposition may be advantageously effected by electroplating.

The deposit is preferably nickel; it may also be copper, silver, gold, platinum, "Monel" alloy, titanium, iron.

Its thickness is generally between 0.01 mm and 5 mm; it is preferably of the order of 0.05 mm.

The diameter of the pores of the deposit is less than 0.5 mm, with permeability greater than 100 cm/h.

The invention also has as object a unitary electrode-current collector assembly obtained by the above-defined process, the current collector being formed by a thin adherent porous metal film deposited on an electrode.

With the invention, a current collector may be deposited on an electrode having any shape, the collector very faithfully assuming the exact shape of the surface of the electrode, whatever the shape thereof, even if this latter is very complex. A very thin film may be formed, although firmly attached to the electrode. Thus, a very light collector may be formed, which allows the mass of the electrode-collector assembly to be reduced and so of the electrochemical generator (battery or accumulator) which comprises it. Finally, the porosity of the collector is favorable to gas diffusion through the electrode.

In short then the invention allows a porous and light electrode-collector assembly to be formed, the collector firmly adhering to the electrode.

A few examples will now be given of manufacturing thin non flat electrodes in accordance with the invention, by using non limiting embodiments of the process of the invention. In these examples, the parts are given by weight.

EXAMPLE 1

30 parts of silver catalyzed carbon (electrocatalytic compound)
60 parts of graphite ⎫
⎬ electronic conductors
4 parts of carbon black ⎭
60 parts of PTFE of "Soreflon" 6-20 type
are intimately mixed with
50 parts of Rissela oil (lubricant).

The mixture is obtained by operating for thirty minutes in a rotary mixer, namely a pot rotating about a horizontal axis at a peripheral speed of 20 meters/minute.

Thus a paste is obtained which is fed, either in loose form, by uniform sprinkling, or as a preform, after precompression of the paste into a "cake", into a mold having the shape which corresponds to the one it is desired to give to the electrode, the mold being previously heated to 50° C.

Shaping is achieved by compression of the paste in the mold by means of a piston cooperating with the mold, by applying a relative movement between the mold and the piston (fixed mold and movable piston, movable mold and piston or finally fixed piston and movable mold), the compression pressure being for example of the order of a ton per $cm^2$, but depending of course on the plasticity of the mixture subjected to compression. The compression is carried out with fixed volume, a nozzle or vent holes allowing removal of the excess paste from the mold.

The electrode formed is discharged from the mold and the lubricant is eliminated, for example by washing with a solvent.

The electrode may be provided with a current collector, either in a conventional way, or preferably as described hereafter.

EXAMPLE 2

55 parts of carbon catalyzed by manganese dioxide 45 parts of PTFE of ICI series CD type are intimately mixed with 50 parts of kerosene (lubricant).

The mixing is carried out in a mixer of the "concrete mixer" type.

The pasty mixture thus obtained is fed, through a feed regulating supply hopper, into an injection press. A hydraulic piston pushes the homogeneous paste with a smooth movement into an injection chamber or pot maintained at about 50° C.; the paste then passes through a nozzle to penetrate into a mold, preferably also heated to 50° C., having the shape which corresponds to the one which it is desired to give to the electrode. The paste takes on the desired shape for the electrode. The mold is then opened and the electrode discharged.

The electrode thus obtained is provided with a current collector as indicated in example 1 and the lubricant is eliminated, for example by evaporation.

EXAMPLE 3

The procedure is the same as in example 2 in so far as the mixed products and the mixing operation are concerned.

The pasty mixture thus obtained is injected in a continuous flow through an appropriate nozzle which delivers a hollow tube of paste. The solvent is eliminated by passing it through a conformator operating either by pressure or by suction.

The tube is cut into sections of desired length to form electrodes which are provided with a current collector as previously indicated.

EXAMPLES 4 and 5

First of all a pasty mixture is prepared having the same composition and obtained in the same way as for the process of example 1 (example 4) or having the same composition and obtained in the same way as for the process of example 2 (example 5).

The paste thus obtained is preformed by precompression under a pressure of 20 to 80 kg/cm$^2$ and at a speed of 5 to 10 cm/minute, preferably in a vacuum, to form a "cake" or preform which is fed into the pot of a transfer machine. By applying a pressure to the cake, the paste is caused to pass from the pot into the compression chamber of the transfer machine; a hydraulic piston transfers a given amount of this paste from the compression chamber into the mold which has the shape corresponding to the one it is desired to give to the electrode. The pressure on the cake depends on the desired reduction ratio; it is for example from 100 to 200 kg/cm$^2$ for a reduction ratio of 20 and from 600 to 800 kg/cm$^2$ for a reduction ratio of 180. The pot, the compression chamber and the mold are maintained at a temperature of about 50° C.

The different parts mentioned above of the transfer machine are arranged so as to provide a path without change of direction of the paste so as to maintain the PTFE fibers parallel to each other.

As in examples 1 to 3, the collector is provided and the lubricant is eliminated from the electrode obtained by compression in the mold, after discharge from the mold.

In the accompanying FIGS. 1 to 9 some shapes of electrodes have been shown, given of course by way of non limiting examples, which may be obtained with the process of the invention. In these drawings:

FIG. 1 shows in perspective an electrode 1 in the shape of a hollow cylindrical tube open at both ends 2 and 3 and circular in section;

FIG. 2 shows in perspective an electrode 4 in the shape of a hollow cylindrical glove finger, open at its end 5 but closed by a hemispherical cap 6 at the other end;

FIG. 3 shows in perspective an electrode in the form of a hollow truncated cone, open at both ends 8 and 9;

FIG. 4 shows in perspective an electrode 10 in the shape of a hollow truncated cone shaped glove finger open at one of its ends 11 but closed at the other end by a hemispherical cap 12;

FIG. 5 illustrates in perspective a tubular electrode 13 non circular in section; this electrode is hollow and it is open at both its ends 14 and 15;

FIG. 6 shows in perspective an electrode 16 in the shape of a hollow prism open at both its ends 17 and 18;

FIG. 7 shows in perspective an open electrode 19 having in section the shape of ω and comprising an external surface 20 and an internal surface 21;

FIG. 8 shows in perspective a tubular electrode 22 whose thickness varies, this electrode being open at both its ends 23 and 24;

FIG. 9 finally illustrates in perspective an electrode 25 having a table-like surface 26 and a number of longitudinal ribs 27.

The accompanying FIGS. 1 to 9 show that it is possible to obtain electrodes having any desired shape. It is in fact always possible to cause the paste having the composition of the invention to pass through the nozzle of a die having the desired shape and thus to obtain the electrode section desired.

The thicknesses and the shapes of the electrode are of course adapted to the qualities sought, such as mechanical strength, ease of diffusion of the gases, electroactivity, sealing etc . . .

Generally the thicknesses of the electrodes are between about 0.05 and about 5 mm, preferably in the neighborhood of 0.5 mm. It has been seen that the electrode may have a varying thickness, as is illustrated for example in FIG. 8.

The average diameter of the residual pores does not exceed 10 microns, the permeability being of the order of about 100 cm/h.

In some cases, a nozzle may be used comprising a central core and an annular opening and the paste may be drawn in the form of a tube.

Thus, tubular electrodes may be obtained open at both ends (FIGS. 1, 5, 6, 8) or else open at one end and closed at the other end, i.e. in the shape of a glove finger (FIG. 2), or even closed at both ends. Their thickness may be variable (FIG. 8).

The truncated cone shape (FIGS. 3 and 4) may be obtained by several methods, for example by compression, injection or extrusion-blowing in a mold having a conical shape. The truncated cone shaped surfaces may be either open at both ends (FIG. 3), or open at one end and closed at the other end (FIG. 4), or even closed at both ends. They may be of revolution or they may not be of revolution and they may have either uniform thickness or non uniform thickness.

The conical or cylindrical electrodes, when they are closed at one end (the glove finger shape of FIGS. 2 and 4) may be closed by a hemispherical surface having a continuity of shape with the cylindrical or conical surface.

In so far as the collector is concerned, it may be positioned advantageously in the way which will be described with reference to examples I to IX, and to the accompanying FIGS. 10 to 15 or else by a conventional process, such as that of the insert core. In this latter case, the current collector may be formed by a metal grid, an expanded metal sheet, tapes or filaments, a capsule. The insert core is positioned in the mold, preferably against the walls, the insert is preferably fixed, for example by nipping, to the mold before the paste is fed under pressure to the mold, said paste surrounding the collector while incorporating it into its mass.

In some of the accompanying FIGS. 1 to 9, the collector c has been shown in position in the electrode.

EXAMPLE I 45 parts by weight of polytetrafluorethylene, more especially in the form of particles obtained from dry fibers and having an average size of the order of 0.5 mm, obtained by coagulation of a polytetrafluorethylene emulsion
and 55 parts by weight of silver catalyzed carbon are intimately mixed with 50 parts by weight of a lubricant such as kerosene,
so as to obtain a paste.

This paste is calendered between rollers heated to 50° C. so as to obtain a 0.5 mm thick strip.

Figure 1:
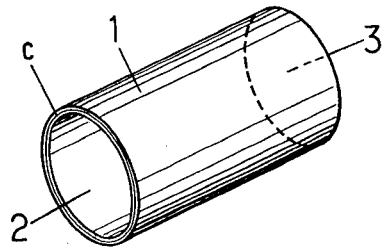
Figure 2:
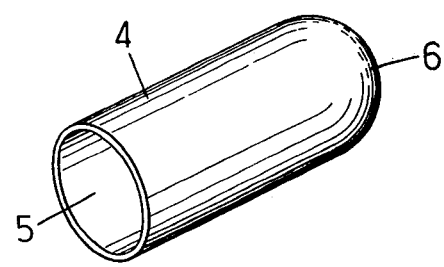
Figure 3:
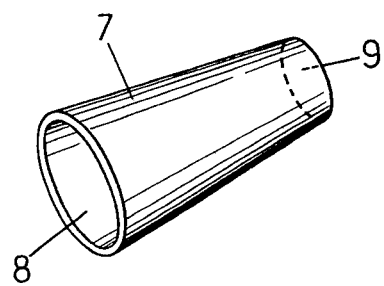
Figure 4:
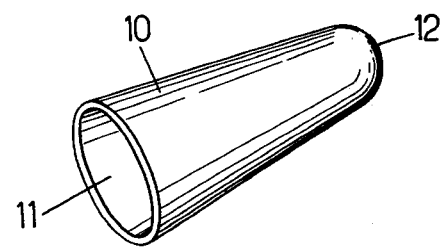
Figure 5:
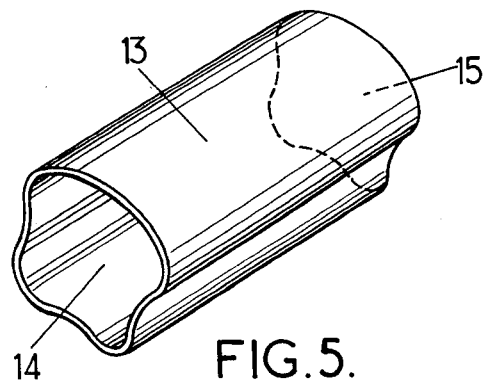
Figure 6:
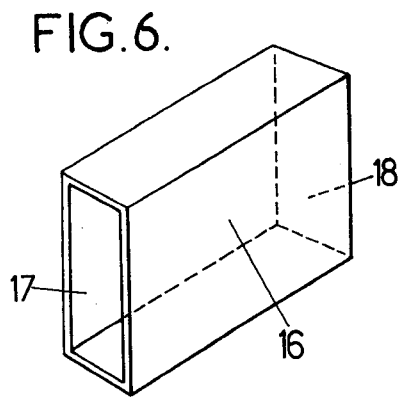
Figure 8:
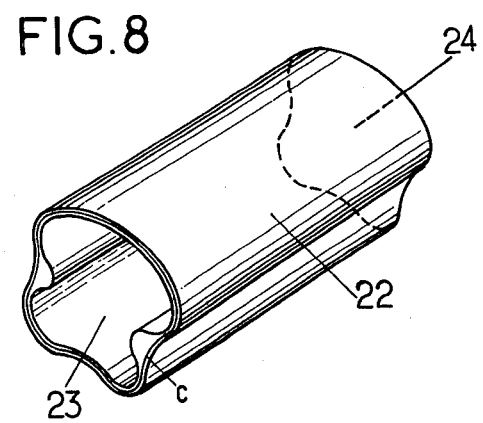
Figure 7:
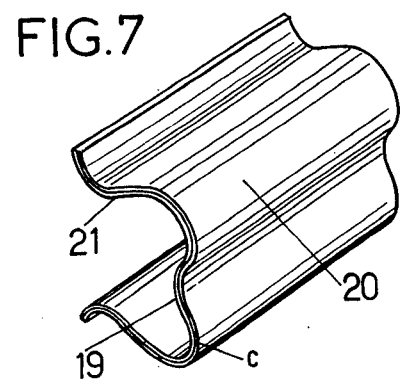
Figure 9:
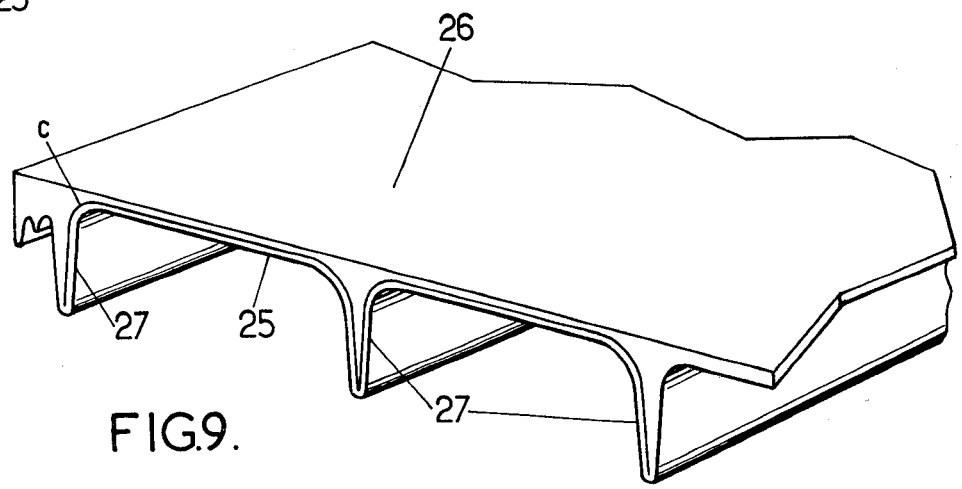
Figure 10:
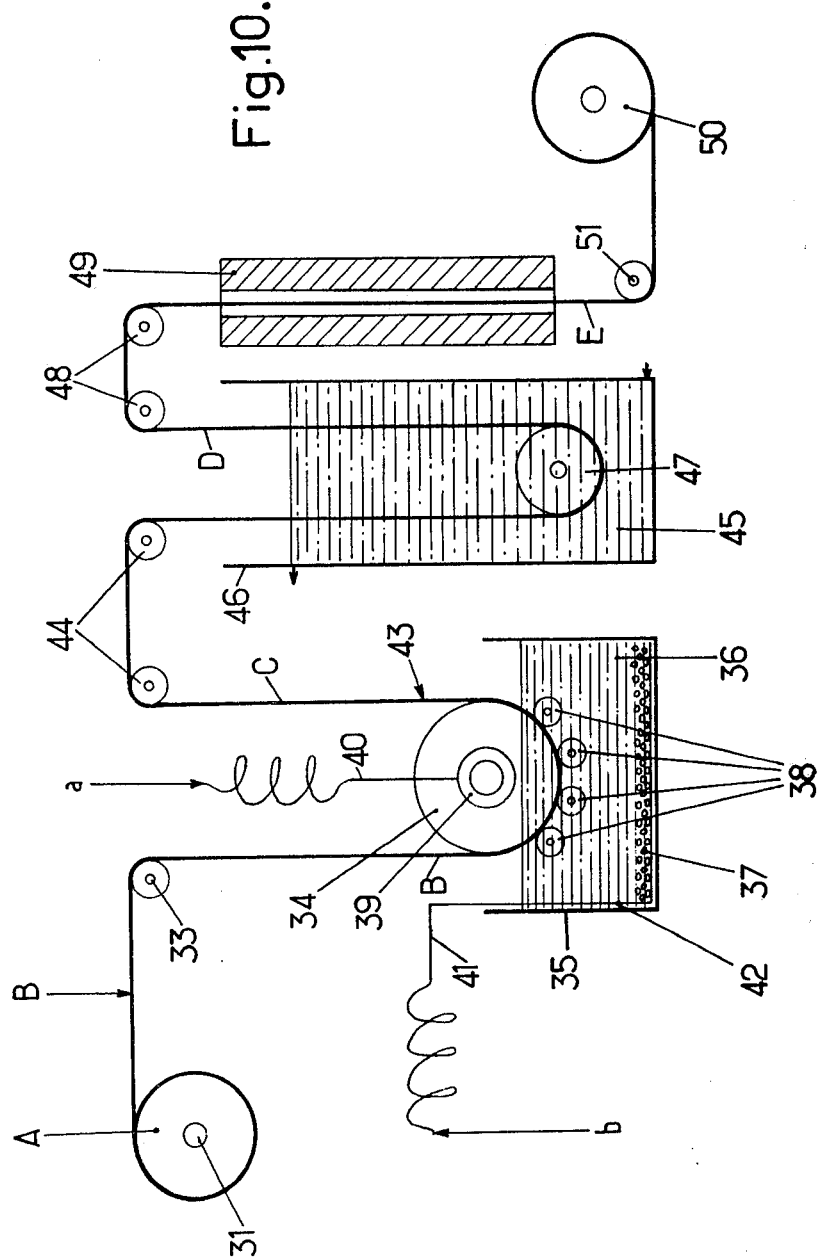
FIG. 10 illustrates, schematically and in section, a first embodiment of a device for implementing the process of the invention.

As can be seen in FIG. 10, a roll A of this strip is mounted on a mandrel 31; the unrolled strip B passes over a change of direction roller 33 then over a conducting roller 34 disposed in an electrodeposition tank 35, filled with an electrolytic bath containing a solution of a soluble nickel salt; a soluble nickel anode, formed for example by nickel balls 37, is disposed in the electrolytic bath 36. Presser rollers 38 apply strip B against the conducting roller 34; the electric voltage for electrolysis is applied between terminals a and b connected respectively to the shaft 39 of the conducting roller 34 by conductor 40 and to the soluble anode, formed by balls 37, through a conductor 41 and a conducting plate 42 in contact with these balls.

By way of example, the electrolytic bath contains 80 g of nickel, in the form of nickel sulfonate and 30 g of boric acid, per liter of solution. The density of the electrodeposition current is 100 amps/dm$^2$ of immersed electrode and the travelling speed of strip B is such that each electrode portion remains in the electrolytic bath for a length of time between 30 seconds and several minutes, depending on the thickness of the desired nickel deposit. This deposit having to form the current collector. It is face 43 of strip B opposite the face in contact with conducting rollers 34 which receives the nickel deposit which will form the current collector.

Strip comprising on its face 43 the nickel deposit which will form the current collector, after passing over the change of direction rollers 44, passes through a rinsing bath 45 disposed in a tank 46, while passing round a pulley 47. On leaving the rinsing bath, the cleaned strip D arrives, after passing round the change of direction rollers 48, in a drying oven 49 in which it is dried and finally the dry electrode E is wound on a drum 50 after passing round a change of direction roller 51.

Thus, there is obtained on drum 50 a strip formed by the electrode material coated on one face with a nickel current collector.

This strip is then cut up into portions of desired shape and size and it is even possible then to give it the desired configuration in space, namely by for example compression, injection or by transfer.

EXAMPLE II 60 parts by weight of polytetrafluorethylene of the same quality as in example 1
30 parts by weight of carbon catalyzed by means of manganese dioxide
6 parts by wieght of graphite
4 parts by weight of conducting carbon black are intimately mixed with
45 parts of kerosene
and a paste is obtained.

This paste is injected into a mold heated to about 50° C., then discharged therefrom in the desired shape. For example there is removed from the mold a truncated cone shaped glove finger electrode (truncated cone of revolution whose low part is closed by a hemispheric cap). Such an electrode is illustrated at F in FIG. 11.

Figure 11:
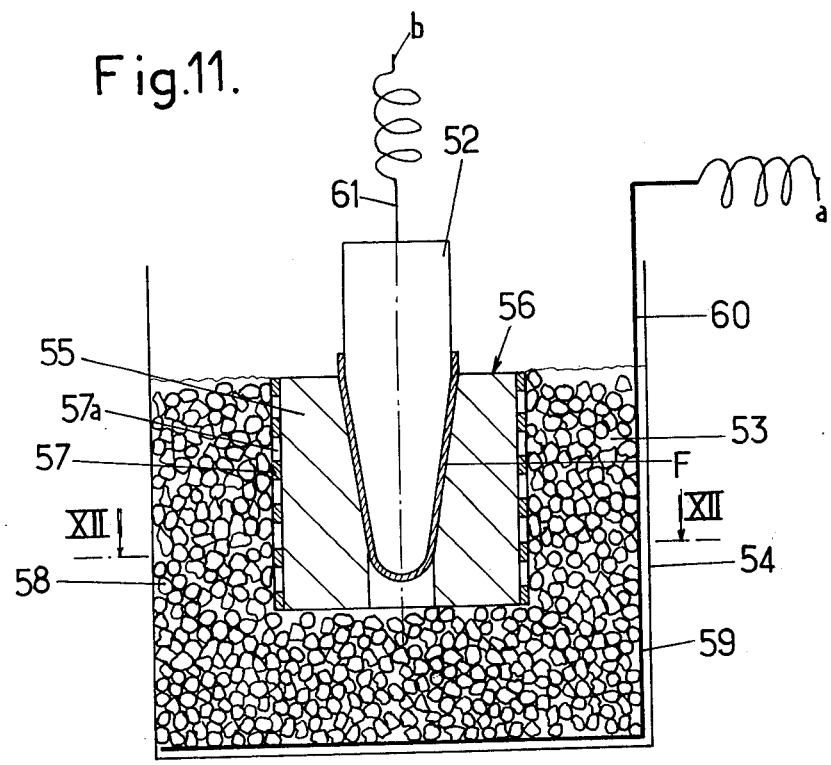
FIG. 11 illustrates in section one embodiment of a device for implementing the process of the invention.

This electrode F is placed, as illustrated in FIG. 11, on a mandrel 52 which plunges in an electrolytic bath 53 having the same composition as the one indicated in example I and which is disposed in a tank 54.

The assembly of mandrel 52 and electrode F rests on ribs 55 of an electrode carrier 56 whose periphery 57 is pierced with holes 57a for allowing the electrolytic solution to pass therethrough. The purpose of ribs 55 is to apply electrode F against mandrel 52, so as to improve the electric contact between this mandrel, which is conducting, and the electrode. This can be seen more especially in FIG. 12, which is a section through XII—XII of FIG. 11.

The nickel balls 58 are disposed in the space between tank 54 and electrode carrier 56, these balls being disposed in the electrolytic bath 53 and being in electrical contact with a conducting part 59, for example made from titanium, connected by a conductor 60 to one of the electric current supply terminals a, whose other terminal b is connected to mandrel 62 through a conductor 61.

The current density applied is 100 amps/dm$^2$ of immersed electrode. The power is switched on, and so the deposit is applied, for a period of time between 30 seconds and 2 minutes. The electrode coated with the electrodeposited nickel layer is dried then the lubricant is removed, for example by evaporation.

The electrode which has thus just been prepared may be used very advantageously for forming the cathode of an electrochemical generator (battery or accumulator) by associating therewith an anodic mass and separators. For example, it may be used for constructing generators of the type described in another patent application Ser. No. 367,992 filed same day by the same Applicant and entitled "Electrochemical generator comprising a thin gas electrode".

EXAMPLES III, IV and V

Metal deposits may be formed, in accordance with the invention, of a non uniform thickness over the surface of the electrode to be coated. Thus, current collectors may be formed having a non constant thickness.

Figure 13:
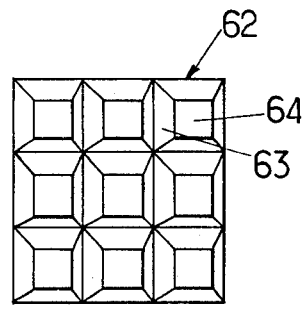
FIGS. 13, 14 and 15 show three collector structures obtained by the process of the invention, respectively honeycomb, ribbed and screen-like, these figures being partial top views (FIGS. 13 and 15) or a perspective view (FIG. 14) of a collector portion.
Figure 14:
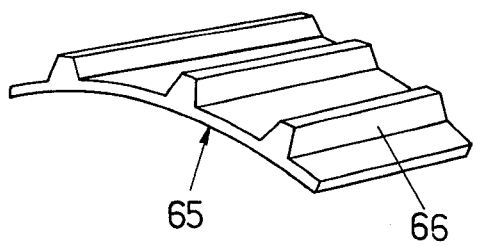
Figure 15:
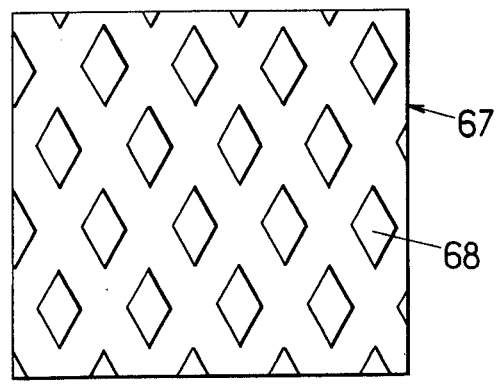

Thus, the metal deposit, and so the current collector, may be given a honeycomb structure (collector 62 illustrated partially in FIG. 13, in which can be seen projecting ribs 63 intersecting at right angles to define "caissons" 64), a ribbed structure (as shown in FIG. 14, which illustrates a portion of such a curved collector 65 comprising projecting ribs 66), a frame-like structure (as illustrated in FIG. 15, which represents an electrode 67 comprising diamond shaped projections 68), a trelliswork or tongued structure for example.

Such structures permit electrode-current collector assemblies to be obtained better adapted to withstand mechanical stresses in one or more given directions or to promote conductibitlity in one or more directions, while not disturbing the general permeability of the electrode due to the reduced thickness of the deposit in the main part of the deposit, for example between the ribs or between the diamonds.

In a variation, a uniform deposit may first of all be formed, then a deposit having a particular structure superimposed on the first uniform deposit.

Figure 12:
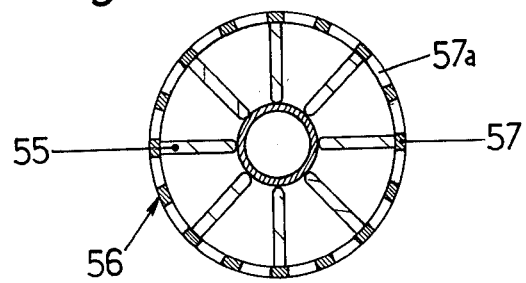
FIG. 12 is a section along XII—XII of FIG. 11.

Non uniform deposits, particularly those described in examples III (FIG. 13), IV (FIG. 14) and V (FIG. 15) may be obtained by means of masks applied to the electrode during electrolytic deposition, these masks being for example similar to ribs 55 illustrated in FIGS. 11 and 12.

EXAMPLES VI and VII

In these examples the electrolytic bath indicated for examples I and II is replaced by the following bath: 220 g/l of copper sulfate and 30 g/l of sulfuric acid, the soluble anode being formed by an electrolytic copper plate, in place of the nickel balls. The current density used is then several tens of amps/dm$^2$.

EXAMPLES VIII and IX

The electrolytic bath of examples I and II is replaced by the following electrolytic bath: 30 g/l of silver cyanide, 70 g/l of sodium cyanide and 40 g/l of sodium carbonate, the soluble anode being formed by a silver foil instead of nickel balls; the current density used is then several tens of amps/dm$^2$.

Within the scope of the invention, deposits may also be formed from gold, platinum, Monel alloy, titanium or even iron (this latter metal being of course more economical).

The process of the invention is very advantageous for it is particularly simple, it is adapted for applying a collector to an electrode of any form whatsoever, the amount of metal deposited may be adjusted at will and it can be easily automated.

A current collector is obtained by this process formed by a metal film deposited on an electrode of any form whatsoever, the film being porous, adhering perfectly to the electrode, whatever the shape of this latter, and perfectly adapted to the desired conductibility and to the desired mechanical strength.

It should also be noted that the process of the invention does not require prior purchase or storage of grids or foils, which are necessary in the case of the processes of the prior technique mentioned in the preamble to the present application.

As is evident, and as it follows moreover already from what has gone before, the invention is in no wise limited to those of its modes of application and embodiments which have been more especially considered; it embraces, on the contrary, all variations thereof.

I claim:

1. A process for manufacturing an electrode, particularly a thin gas electrode of any non-flat shape, said process comprising preparing a homogeneous mixture of dry particles of active compounds, said homogeneous mixture comprising at least one compound with electrocatalytic activity or at least one compound with electrocatalytic activity and at least one compound presenting electronic conductivity, and dry fibers of polytetrafluorethylene, adding a lubricant or a mixture of a lubricant and a surfactant so as to cause coating of the particles of the mixture with the lubricant, and shaping the lubricated particles of the mixtute so as to form the electrode.

2. The process according to claim 1, characterized in that the dry fibers of polytetrafluorethylene have an average size of the order of 0.5 mm and were obtained by coagulation of a PTFE emulsion.

3. The process according to claim 1, characterized in that the shaping operation and conveying of the lubricated mixture to the shaping operation are performed without change of direction of the lubricated mixture flow so as to maintain the orientation of the PTFE fibers such that these fibers remain parallel to each other.

4. The process according to claim 1, characterized in that the electrode obtained has a thickness of the order of 0.05 to 5 mm.

5. The process according to claim 1, characterized in that the compound with catalytic activity is formed by catalyzed carbon.

6. The process according to claim 1, characterized in that the electronic conducting compound is formed by a carbon black or graphite.

7. The process according to claim 1, characterized in that the lubricant is formed by at least one liquid hydrocarbon.

8. The process according to claim 1, characterized in that the lubricant is formed by at least an oil.

9. The process according to claim 1, characterized in that the mixture is formed in a mixer rotated at high speed.

10. The process according to claim 1, characterized in that prior to the shaping operation the homogeneous mixture is compressed, before or after addition of the lubricants or the mixture of the lubricant and of the surfactant.

11. The process according to claim 1, characterized in that the shaping operation is achieved by compression, by injection or by transfer.

12. An electrode, particularly a thin gas electrode, of any desired shape obtained by preparing a homogeneous mixture of dry particles of active compounds, formed by at least one compound with electrocatalytic activity or at least one compound with electrocatalytic activity and at least one compound presenting electronic conductivity, and dry polytetrafluorethylene fibers, by adding a lubricant or a mixture of a lubricant and of a surfactant, so as to cause coating of the particles of the mixture by the lubricant, shaping the lubricated particles of the mixture and eliminating the lubricant.

13. An electrode, particularly a positive or cathode electrode, according to claim 12, characterized in that it further comprises an incorporated collector.

14. A process for preparing a current collector for an electrode, said process comprising depositing, on at least a part of the surface of this electrode, a thin porous metal film, adhering to said electrode, the deposition being carried out by electroplating on said electrode, said electrode obtained by preparing a homogeneous mixture of dry particles of active compounds, said homogeneous mixture comprising at least one compound with electrocatalytic activity or at least one compound with electrocatalytic activity and at least one compound presenting electronic conductivity, and dry polytetrafluorethylene fibers, adding a lubricant or a mixture of a lubricant and of a surfactant, so as to cause coating of the particles of the mixture by the lubricant, shaping the lubricated particles of the mixture and eliminating the lubricant.

15. The process according to claim 14, characterized in that the deposit is formed from nickel.

16. The process according to claim 14, characterized in that the deposit is formed from copper.

17. The process according to claim 14, characterized in that the deposition is stopped when the deposit has a thickness between 0.01 and 5 mm.

18. A unitary electrode-current collector assembly obtained by the process according to claim 14, the current collector being formed from a thin adherent porous metal film deposited on an electrode.

19. The unitary assembly according to claim 18, characterized in that the diameter of the pores of the deposit is less than 0.5 mm, with a permeability greater than 100 cm/h.

* * * * *